(12) United States Patent
Ng et al.

(10) Patent No.: US 12,622,444 B2
(45) Date of Patent: May 12, 2026

(54) SYSTEM AND METHOD FOR EFFICIENT PELLET MANUFACTURING

(71) Applicant: PERFETTI VAN MELLE BENELUX BV, HK Breda (NL)

(72) Inventors: Gigi Ng, East Hanover, NJ (US); David Guevara, Puebla (MX); Bharat Jani, East Hanover, NJ (US)

(73) Assignee: PERFETTI VAN MELLE BENELUX BV, HK Breda (NL)

( * ) Notice: Subject to any disclaimer, the term of this patent is extended or adjusted under 35 U.S.C. 154(b) by 541 days.

(21) Appl. No.: 17/623,159

(22) PCT Filed: Jul. 15, 2020

(86) PCT No.: PCT/US2020/042121
§ 371 (c)(1),
(2) Date: Dec. 27, 2021

(87) PCT Pub. No.: WO2021/021441
PCT Pub. Date: Feb. 4, 2021

(65) Prior Publication Data
US 2022/0287322 A1     Sep. 15, 2022

Related U.S. Application Data

(60) Provisional application No. 62/880,467, filed on Jul. 30, 2019.

(51) Int. Cl.
*A23G 7/00*     (2006.01)
*A23G 3/02*     (2006.01)
(Continued)

(52) U.S. Cl.
CPC ......... *A23G 7/0018* (2013.01); *A23G 3/0023* (2013.01); *A23G 3/0027* (2013.01);
(Continued)

(58) Field of Classification Search
CPC .. A23G 7/0018; A23G 3/0023; A23G 3/0027; A23G 3/0247; A23G 3/0257; A23G 4/04; A23G 7/0068; A23G 4/02
See application file for complete search history.

(56) References Cited

U.S. PATENT DOCUMENTS

| | | | |
|---|---|---|---|
| 3,200,685 A | 8/1965 | Heilbrunn | |
| 3,301,454 A | 1/1967 | Wayne et al. | |

(Continued)

FOREIGN PATENT DOCUMENTS

| | | | | |
|---|---|---|---|---|
| AT | 516482 A1 * | 5/2016 | ............. | A21C 15/04 |
| CN | 1294494 A | 5/2001 | | |

(Continued)

OTHER PUBLICATIONS

AT-516482-A1 (Clarivate machine translation) (Year: 2016).*

(Continued)

*Primary Examiner* — Nikki H. Dees
*Assistant Examiner* — Andrew E Merriam
(74) *Attorney, Agent, or Firm* — Silvia Salvadori, P.C.; Silvia Salvadori

(57) ABSTRACT

A method for separating a trim section from a body of comestible structure includes forming a trim score line in the body of the comestible structure to define the trim section in the body of comestible structure and actively applying a force to the trim section via a force generating device to separate the trim section from the body of comestible structure along said trim score line.

18 Claims, 6 Drawing Sheets

(51) Int. Cl.

| | |
|---|---|
| *A23G 3/34* | (2006.01) |
| *A23G 4/04* | (2006.01) |

(52) U.S. Cl.
CPC ......... *A23G 3/0247* (2013.01); *A23G 3/0257* (2013.01); *A23G 4/04* (2013.01); *A23G 7/0068* (2013.01)

(56) References Cited

U.S. PATENT DOCUMENTS

| | | | |
|---|---|---|---|
| 6,254,373 B1 | 7/2001 | Hoffman et al. | |
| 6,419,969 B2 | 7/2002 | Lefebvre | |
| 6,843,168 B2 * | 1/2005 | Refer ..................... | A23G 1/207 |
| | | | 99/452 |
| 7,442,026 B2 * | 10/2008 | Shulski ................ | A23G 3/0252 |
| | | | 425/236 |
| 8,226,401 B2 | 7/2012 | Olejarski et al. | |
| 2013/0202734 A1 | 8/2013 | Jani et al. | |
| 2015/0250202 A1 | 9/2015 | Jani et al. | |
| 2016/0021909 A1 * | 1/2016 | Brown ..................... | A23G 4/18 |
| | | | 426/5 |
| 2016/0309737 A1 * | 10/2016 | Wymore ................ | B26D 3/085 |
| 2019/0230954 A1 | 8/2019 | Jani et al. | |

FOREIGN PATENT DOCUMENTS

| | | | |
|---|---|---|---|
| GB | 796373 A | 6/1958 |
| GB | 2422291 A | 7/2006 |
| JP | 49889 U | 1/1974 |
| JP | 59187989 U | 12/1984 |
| RU | 2322071 C1 | 4/2008 |
| RU | 2657021 C2 | 6/2018 |

| | | | |
|---|---|---|---|
| WO | 1993017579 A1 | 9/1993 |
| WO | 2015179630 A1 | 11/2015 |
| WO | 2016064723 A1 | 4/2016 |

OTHER PUBLICATIONS

PCT Notification of Transmittal of The International Search Report (ISR); International Application No. PCT/US2020/042121; International Filing Date: Jul. 15, 2020; Date of Mailing: Nov. 16, 2020; pp. 1-5.

PCT Notification of Transmittal of The ISR—Written Opinion; International Application No. PCT/US2020/042121; International Filing Date: Jul. 15, 2020; Date of Mailing: Nov. 16, 2020; pp. 1-9.

Japanese Office Action for JP Application No. 2022-500886; Report Mail Date Aug. 2, 2023 (4 Pages; with machine translation).

Russian Office Action for Russian Application No. 2021139878; Report Mail Date Jun. 22, 2023 (12 Pages; with machine translation).

Russian Office Action; Russian Application No. 2021139878; Date: Jun. 26, 2022; 10 pages.

Russian Office Action; Russian Application No. 2021139878; Date: Nov. 16, 2022; 7 pages.

Japanese Office Action for JP Application No. 2022-500886; Report Mail Date Feb. 28, 2023 (5 Pages; with machine translation).

International Preliminary Report on Patentability; International Application No. PCT/US2020/042121; International Filing Date: Jul. 15, 2020; Date of Mailing: Feb. 1, 2022; 8 pages.

Chinese Office Action for Chinese Application No. 202080049121.9; Report Mail Date Dec. 1, 2023 (11 Pages—with English Translation).

* cited by examiner

SYSTEM AND METHOD FOR EFFICIENT PELLET MANUFACTURING

CROSS REFERENCE TO RELATED APPLICATIONS

This application is a National Stage application of PCT/US2020/042121, filed Jul. 15, 2020, which claims the benefit of U.S. Provisional Application Ser. No. 62/880,467, filed Jul. 30, 2019, both of which are incorporated by reference in their entirety herein.

FIELD

The present disclosure relates to comestible manufacturing methods and systems and more particularly, to a method and system for separating at least a portion of a comestible structure after scoring and/or cutting the comestible structure.

BACKGROUND

Typically, the process of making and packaging comestibles, such as a confection or chewing gum, is time-consuming and involves a significant amount of machinery. For example, the process of making and packing gum products can include mixing and producing a finished gum as a non-uniform output, extruding and forming the finished gum into loaves, conditioning the loaves of the finished gum, extruding the loaves into a continuous thin sheet of the finished gum, rolling the continuous sheet through a series of rollers to a uniform reduced thickness, scoring and dividing sheets into individual scored sheets, conditioning the individual sheets in a conditioning room, dividing sheets into gum pieces, and packaging the gum pieces. Such processes of making and packaging gum products are disclosed in U.S. Pat. No. 6,254,373 assigned to the predecessor of interest of the present assignee, and U.S. patent application Ser. No. 12/352,110 assigned to the present assignee; the teachings and disclosures of which are hereby incorporated by reference in their entireties to the extent not inconsistent with the present disclosure.

During the manufacturing process, the lateral edges of the gum are typically removed such that the outermost pieces formed in the gum have a desired edge. The material that is trimmed or removed from the edges of the gum may be recycled back to an upstream portion of the manufacturing system to reduce waste. This trimming of material, as performed in existing manufacturing systems, generally includes forming one or more scores in the gum to define the portion of the gum to be trimmed. The scored gum is supported, such as by a sliding surface or glide plate. However, the width of the scored gum is greater than the width of the sliding surface such that the portion of the gum to be trimmed is not directly supported by the sliding surface. As a result, the gravitational forces acting on the portion of the gum to be trimmed, cause these portions at the outermost edges of the gum to separate from the remainder of the gum along the score lines.

While this method of separating the trim portions of the gum via gravity is suitable when the edges of the formed pieces have a planar configuration, such a method may not be suitable for trimming material along a score having a non-linear configuration. This may be a result of the increased length (measured in a vertical plane) over which the trimmed material must be separated from the remainder and/or because the gravitational force acting on the trimmed portion is only partially applied in a direction of separation.

BRIEF SUMMARY

According to an embodiment, a method for separating a trim section from a body of comestible structure includes forming a trim score line in the body of the comestible structure to define the trim section in the body of comestible structure and actively applying a force to the trim section via a force generating device to separate the trim section from the body of comestible structure along said trim score line.

In addition to one or more of the features described above, or as an alternative, in further embodiments actively applying a force to the trim section via said force generating device includes applying a tensile force to the trim section.

In addition to one or more of the features described above, or as an alternative, in further embodiments said force generating device includes a roller.

In addition to one or more of the features described above, or as an alternative, in further embodiments actively applying a force to the trim section via said force generating device includes applying a shearing force to the trim section.

In addition to one or more of the features described above, or as an alternative, in further embodiments said force generating device includes at least one compressed air delivery unit.

In addition to one or more of the features described above, or as an alternative, in further embodiments said force is applied to the trim section at an angle relative to a direction of travel of the body of comestible structure.

In addition to one or more of the features described above, or as an alternative, in further embodiments said angle is greater than 0° and less than 90°.

In addition to one or more of the features described above, or as an alternative, in further embodiments a component of said force applied to the trim section is arranged in a direction of breaking.

In addition to one or more of the features described above, or as an alternative, in further embodiments said trim score line has a thickness less than a thickness of the body of comestible structure.

In addition to one or more of the features described above, or as an alternative, in further embodiments forming said trim score line in the body of comestible structure further comprises forming a plurality of scores to define a plurality of portions in the body of comestible structure.

In addition to one or more of the features described above, or as an alternative, in further embodiments the plurality of portions are pieces.

In addition to one or more of the features described above, or as an alternative, in further embodiments the plurality of portions are pellets.

In addition to one or more of the features described above, or as an alternative, in further embodiments comprising forming a comestible mass into the body of comestible structure via a forming system.

In addition to one or more of the features described above, or as an alternative, in further embodiments said forming said comestible mass into the body of comestible structure occurs upstream from said forming said trim score line.

In addition to one or more of the features described above, or as an alternative, in further embodiments said forming said comestible mass into the body of comestible structure and said forming said trim score line occur substantially simultaneously.

In addition to one or more of the features described above, or as an alternative, in further embodiments comprising positioning the trim section relative to the force generating device.

In addition to one or more of the features described above, or as an alternative, in further embodiments said trim score line is formed via a scoring or cutting device and positioning the trim section relative to the force generating device further comprises applying a force to the trim section via a feature formed in said scoring or cutting device.

In addition to one or more of the features described above, or as an alternative, in further embodiments said trim score line has a non-linear configuration.

In addition to one or more of the features described above, or as an alternative, in further embodiments said trim score line has a zig-zag configuration.

In addition to one or more of the features described above, or as an alternative, in further embodiments said comestible structure includes a chewing gum.

In addition to one or more of the features described above, or as an alternative, in further embodiments said comestible structure includes a confection.

In addition to one or more of the features described above, or as an alternative, in further embodiments said actively applied force is a mechanically driven force.

According to another embodiment, a comestible manufacturing system includes a scoring or cutting device operable to form a trim score line in a comestible structure. A trim separating system is arranged downstream from said scoring or cutting device. The trim separating system includes at least one force generating device operable to apply a force to a trim section defined by said trim score line to separate said trim section from said comestible structure along said trim score line.

In addition to one or more of the features described above, or as an alternative, in further embodiments said force applied by said at least one force generating device applies a tension to said trim section.

In addition to one or more of the features described above, or as an alternative, in further embodiments said at least one force generating device is a roller.

In addition to one or more of the features described above, or as an alternative, in further embodiments said at least one force generating device is operable to apply a shearing force to said trim section.

In addition to one or more of the features described above, or as an alternative, in further embodiments said at least one force generating device is a compressed air delivery unit.

In addition to one or more of the features described above, or as an alternative, in further embodiments said at least one force generating device is arranged at an angle relative to a direction of travel of the comestible structure.

In addition to one or more of the features described above, or as an alternative, in further embodiments said angle is greater than 0° and less than 90°.

In addition to one or more of the features described above, or as an alternative, in further embodiments a component of said force applied to the trim section by said at least one force generating device is arranged in a direction of breaking.

In addition to one or more of the features described above, or as an alternative, in further embodiments said trim score line has a thickness less than a thickness of the comestible structure.

In addition to one or more of the features described above, or as an alternative, in further embodiments comprising a forming system for forming and sizing a comestible mass into said comestible structure.

In addition to one or more of the features described above, or as an alternative, in further embodiments said forming system is arranged upstream from said scoring or cutting device.

In addition to one or more of the features described above, or as an alternative, in further embodiments said scoring or cutting device is integrated into said forming system.

In addition to one or more of the features described above, or as an alternative, in further embodiments said scoring or cutting device includes a feature operable to engage said trim section to positioning said trim section relative to said at least one force generating device.

In addition to one or more of the features described above, or as an alternative, in further embodiments said feature includes a spiral-like protrusion aligned with said trim section.

In addition to one or more of the features described above, or as an alternative, in further embodiments said comestible structure includes a chewing gum.

In addition to one or more of the features described above, or as an alternative, in further embodiments said comestible includes a confection.

According to yet another embodiment, a method for separating a trim section from a body of comestible structure along a trim score line includes continuously applying a force to a web of the trim score line via a mechanically driven device. The force is applied in a plane parallel to a surface of the comestible structure. The web is ruptured via said force to separate the trim section from the body of comestible structure.

In addition to one or more of the features described above, or as an alternative, in further embodiments said force applied to said web includes a first component and a second component and said first component extends in a direction transverse to a direction of travel of the body of comestible structure.

In addition to one or more of the features described above, or as an alternative, in further embodiments said first component of said force is smaller than said second component of said force.

In addition to one or more of the features described above, or as an alternative, in further embodiments said second component of said force extends in said direction of travel of the comestible structure.

In addition to one or more of the features described above, or as an alternative, in further embodiments said second component of said force extends perpendicularly to said direction of travel of the comestible structure.

In addition to one or more of the features described above, or as an alternative, in further embodiments continuously applying a force to a web of the trim score line via a mechanically driven device further comprises contacting the trim section with said mechanically drive device.

In addition to one or more of the features described above, or as an alternative, in further embodiments said mechanically driven device includes a roller.

In addition to one or more of the features described above, or as an alternative, in further embodiments said mechanically driven device includes at least one compressed air delivery unit.

In addition to one or more of the features described above, or as an alternative, in further embodiments comprising forming the trim score line in the body of the comestible structure to define the trim section.

In addition to one or more of the features described above, or as an alternative, in further embodiments forming said trim score line in the body of comestible structure further comprises forming a plurality of scores to define a plurality of portions in the body of comestible structure.

In addition to one or more of the features described above, or as an alternative, in further embodiments the plurality of portions are pieces.

In addition to one or more of the features described above, or as an alternative, in further embodiments the plurality of portions are pellets.

In addition to one or more of the features described above, or as an alternative, in further embodiments comprising forming a comestible mass into the body of comestible structure via a forming system.

In addition to one or more of the features described above, or as an alternative, in further embodiments said forming said comestible mass into the body of comestible structure occurs upstream from said forming said trim score line.

In addition to one or more of the features described above, or as an alternative, in further embodiments said comestible structure includes a chewing gum.

In addition to one or more of the features described above, or as an alternative, in further embodiments said comestible structure includes a confection.

BRIEF DESCRIPTION OF THE DRAWINGS

The accompanying drawings incorporated in and forming a part of the specification embodies several aspects of the present invention and, together with the description, serve to explain the principles of the invention. In the drawings.

DETAILED DESCRIPTION

The following disclosure will detail particular embodiments which provide improvements for separating waste portions generated during the manufacturing of a comestible. The comestible may include any type of edible product, including but not limited to chewing gum (at any stage including elastomer, partially finished base, finished chewing gum base, and finished chewing gum), confection (which may be synonymous with chewing gum, candy, or a combination of chewing gum and candy), sweet and savory biscuits and cakes, nuts, and grains for example. In an embodiment, the comestible may include any edible product that is formed into a sheet during manufacture.

For ease of description, the comestible will be referred to herein as chewing gum for the remainder of the description. It should additionally be understood that certain compositions of chewing gum may have a non-uniform texture and/or a multi-layered composition. The chewing gum described herein is referred to as "chewing gum" or "gum" and includes, but is not limited to, compositions ranging from and inclusive of compounded elastomer to finished gum, which may include compounded elastomer in addition to some compounding aids, master batch gum base, compounded elastomer in addition to some subsequent gum ingredients, compounded elastomer in addition to some gum base ingredients and some subsequent gum ingredients, gum base, gum base in addition to some subsequent gum ingredients, master batch finished gum, and finished gum.

During a chewing gum manufacturing process, one or more sections of a gum structure may be removed to form a portion of the gum structure having a desired configuration or contour. The section of the gum structure that is removed is referred to herein as a "trim section."

Figures 1A, 1B:
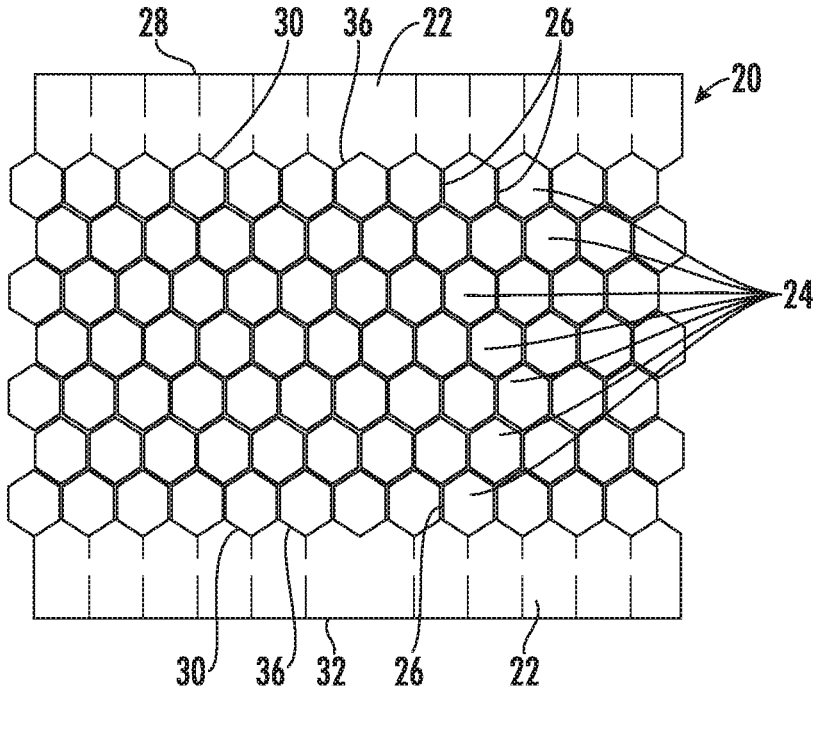
FIG. 1A is a plan view of a gum structure having a plurality of scores formed therein according to an embodiment.
FIG. 1B is a side view of a portion of the scored gum structure of FIG. 1A according to an embodiment.

An example of a gum structure 20 having one or more trim sections 22 is illustrated in more detail in FIGS. 1A and 1B. As shown, the gum structure 20 is a gum sheet having a body including a plurality of portions 24 formed therein. In the illustrated, non-limiting embodiment, the plurality of portions 24 are individual pieces, and in some embodiments, pellets. Gum pellets typically have a non-uniform thickness, such as a hexagon, pillow shape or ball-like shape, and are commonly coated with one or more coating materials to form a finished confection. However, it should be understood that embodiments where the gum structure 20 has another shape and also embodiments where the portions 24 of the gum structure 20 have a different configuration, such as slabs or pieces having a stick configuration (generally rectangular in shape) for example, are also within the scope of the disclosure.

Adjacent portions or pieces 24 formed in the gum structure 20 are generally defined by one or more score lines 26, also referred to herein as "scores." For the purposes of this disclosure, a "score" may be defined as a cut that extends through the gum structure 20 to a depth less than the entire height of the gum structure 20 such that completely separate portions of the gum structure 20 are not created. As a result, a thin web 27, for example having a thickness of less than 30% of the height of the gum structure 20 (best shown in FIG. 1B), will extend between adjacent portions or pieces 24 of the gum structure 20. When the gum structure 20 is scored or cut through a depth less than the entire height of the gum structure 20, the forward motion of the gum structure 20 will convey each of the portions 24 of the gum structure 20 defined by the scores 26 as a single (continuous or non-continuous) structure. Accordingly, when the score 26 does not extend through the entire height or thickness of the gum structure 20, the gum structure 20 may move as a single unit.

One or more trim sections 22 of the gum structure 20 are typically located at an outer periphery of the gum structure 20. However, a trim section 22 located at another position relative to the gum structure 20 is also contemplated herein. In the illustrated, non-limiting embodiment, a first trim section 22 is defined at a first lateral edge 28 of the gum structure 20 and extends to the outermost edge 30 of the adjacent portions of 24, specifically the pieces formed in the gum structure 20. Similarly, a second trim section 22 is located at a second lateral edge 32, opposite the first lateral edge 28, and extends to the outermost edge 30 of the adjacent portions 24 formed in the gum structure 20. The scores that define the outermost edge 30 of the portions 24 and the trim sections 22 may be referred to herein as trim scores or trim score lines 36. Accordingly, the trim score lines 36 may have a configuration complementary to the contour of the portions 24 formed in the gum structure 20. In the illustrated, non-limiting embodiment of FIGS. 1A and 1B, the trim score lines 36 have a non-linear configuration. For example, the entire trim score line 36 extending over the length of the comestible structure (measured along the direction of travel of the comestible structure) is not arranged within a single vertical plane. More specifically, the trim score lines 36 are shown having a zig-zag configuration complementary to the contour of the pellets 24. It should be understood that a trim score line 36 having another configuration is also within the scope of the disclosure.

In an embodiment, the trim score lines 36 that define the one or more trim sections 22 may be formed simultaneously with the scores 26 that define the portions or pieces 24 in the gum structure 20. In other embodiments, the trim score line 36 that defines a trim section 22 may be formed after or downstream from the formation of the scores 26 that define the plurality of portions or pieces 24, or alternatively, may be formed prior to or upstream from the formation of the scores 26 that define the plurality of portions or pieces 24 in the gum structure 20.

Figure 2:
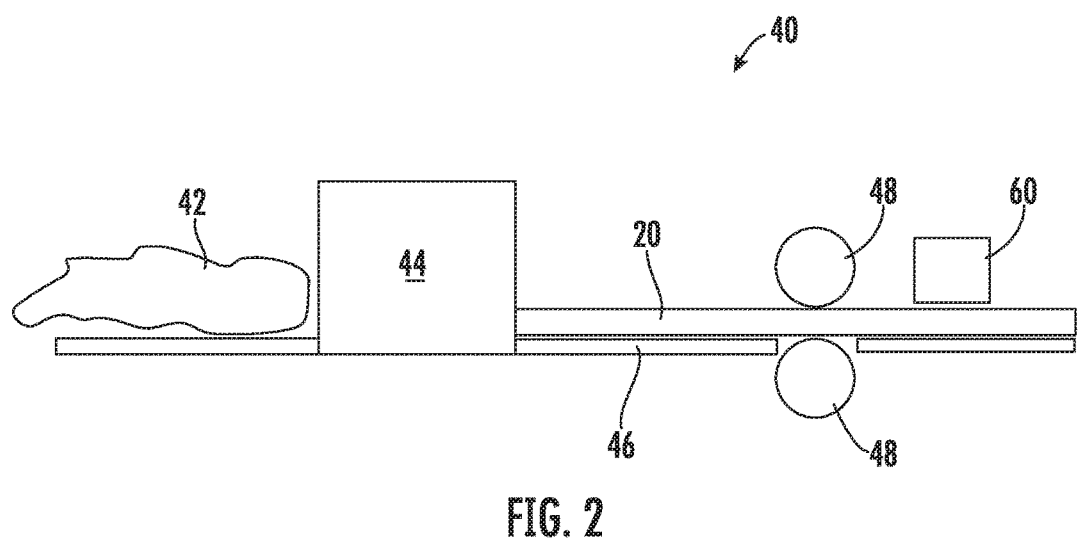
FIG. 2 is a schematic diagram of a portion of a gum manufacturing system.

The gum structure 20 is formed into a desired shape and size prior to the formation of the trim scores 36 therein. For example, as best shown in FIG. 2, within a gum manufacturing system 40, a gum mass 42 may be formed into a gum structure 20 via a forming station, illustrated schematically at 44. Although the gum mass 42 is illustrated as being generally unshaped or non-uniform in the FIG., it should be understood embodiments where the gum mass 42 has a uniform cross-section over its length, such as resulting from being extruded through a die located upstream from the forming station 44 for example, are also contemplated herein. The forming station 44 may include any mechanism or assembly that is capable of forming and/or sizing the gum mass 42 into a gum structure 20 having a desirable thickness, such as between 0.3 mm and 10 mm for example. The gum structure 20 may be sized by the forming station 44 into a sheet having a generally planar upper and lower surface and a substantially uniform thickness prior to formation of the trim scores 36. In an embodiment, the forming station 44 includes two forming rollers as described in U.S. patent application Ser. No. 13/522,767 filed on Nov. 16, 2102. Alternatively or in addition, the forming station 44 may include an extruding device and/or one or more rolling devices. Although the gum structure 20 is illustrated as being output from the forming station 44 as a continuous sheet, embodiments where the gum structure 20 has another shape are also within the scope of the disclosure.

With continued reference to FIG. 2, in the illustrated, non-limiting embodiment, the continuous gum structure 20 output from the forming station 44 is transported downstream by a transport device 46, such as a conveyor for example, to at least one scoring or cutting device 48. The scoring or cutting devices 48 are illustrated in the FIGS. as being located directly downstream from the forming station 44. However, one or more additional system components (not shown) may be disposed between the forming station 44 and the at least one scoring or cutting device 48.

In an embodiment, the at least one scoring or cutting device 48 includes two scoring rollers 48 disposed on opposing sides of the gum structure 20, above and below the gum structure 20, as shown in FIG. 2. However, any configuration of the one or more scoring or cutting devices 48 is contemplated herein. In another embodiment, best shown in FIG. 3, the at least one scoring or cutting device 48 may include a first scoring roller 48 configured to score the gum structure 20 in a first direction, such as parallel to the direction of travel of the gum structure for example, and a second roller 48 located downstream from the first scoring roller 48 and configured to score the gum structure 20 in a second direction, such as perpendicular to the direction of travel of the gum structure 20. The scoring or cutting devices 48 not only define multiple portions 24, such as slabs or pieces in the continuous gum structure 20, but also define the trim sections 22 of the gum structure 20. However, embodiments including scoring or cutting devices 48 configured to form trim scores 36 that define one or more trim sections 22, but not to form scores 26 that define multiple portions 24 in the gum structure 20 are also contemplated herein.

The at least one scoring or cutting device 48 is illustrated as being located separate and downstream from the forming station 44. In an alternative embodiment, the functionality of one or more of the scoring or cutting devices 48 may be integrated into the forming station 44 such that the forming station is not only operable to size the gum mass, but also to form the trim scores 36 and/or scores 26. For example, in an embodiment, the forming station 44 includes a pair of rollers having one or more surfaces that form various portions 24 in the gum mass 42 as it passes through a gap defined between the pair of rollers. In such embodiments, the gum mass 42 is formed into a desired size and shape and scored to form a plurality of portions or pieces 24, simultaneously.

Figure 3:
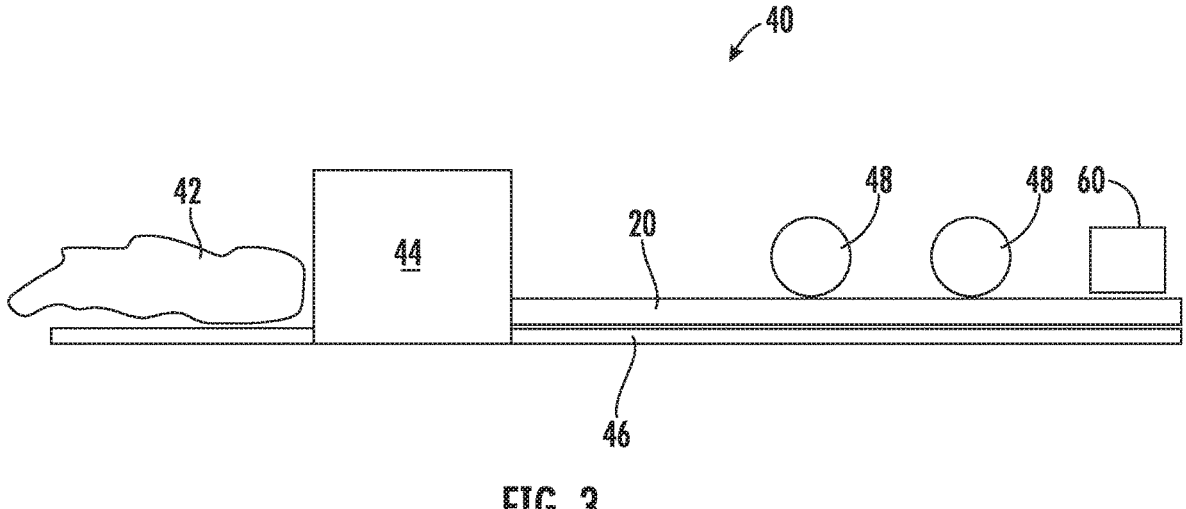
FIG. 3 is a schematic diagram of a portion of another gum manufacturing system.
Figure 4:
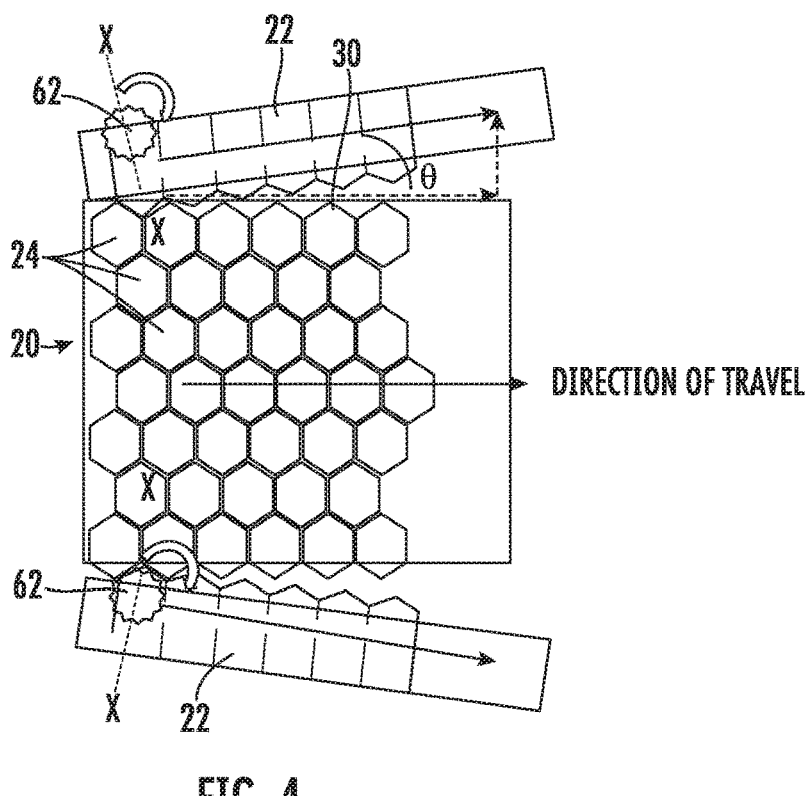
FIG. 4 is a schematic diagram of a trim separation system of a gum manufacturing system according to an embodiment.
Figure 5:
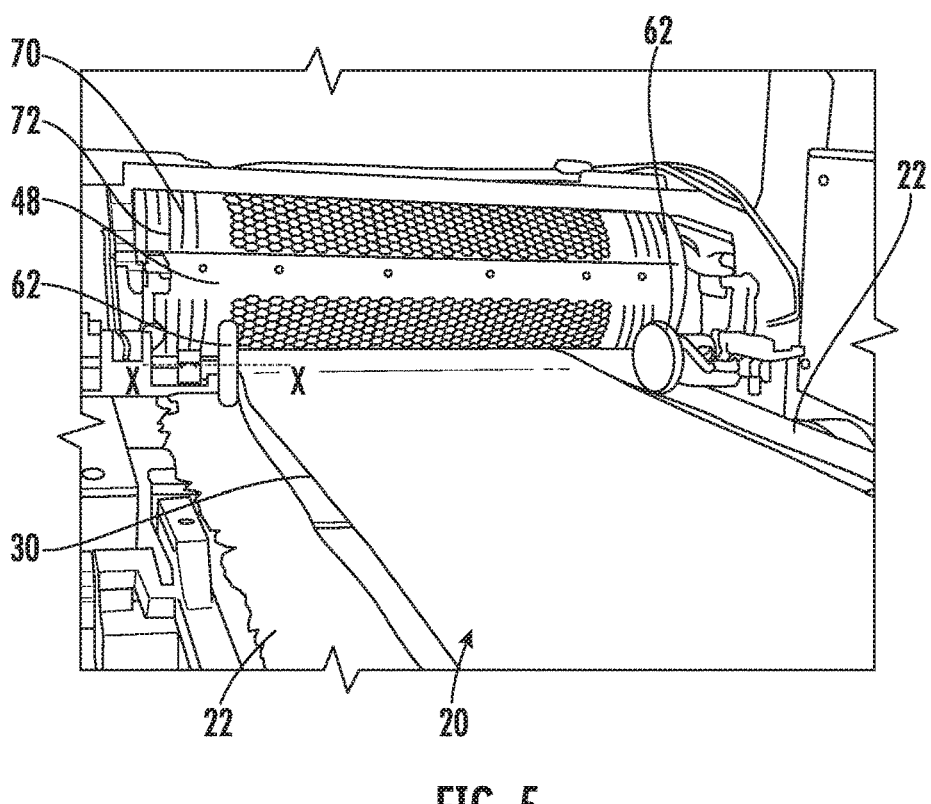
FIG. 5 is a perspective view of a trim separation system according to an embodiment.
Figure 6:
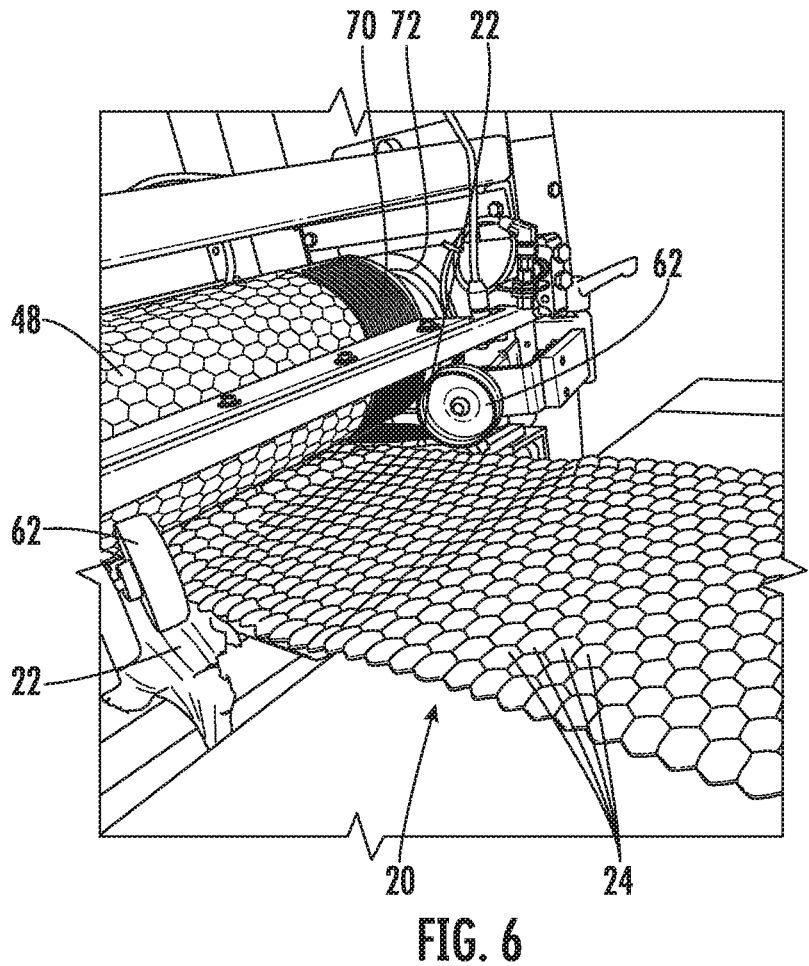
FIG. 6 is a detailed perspective view of a portion of the trim separation system of FIG. 5 according to an embodiment.

With continued reference to FIGS. 2 and 3, the gum manufacturing system 40 may additionally include a trim separating system 60 operable to separate one or more trim sections 22 from the gum structure 20 by actively applying a mechanically driven, for example non-gravitational force to a trim section 22. The trim separating system 60 may be located generally downstream from the one or more components (such as the forming station 44 and/or scoring or cutting devices 48) where the trim scores 36 are formed in the gum structure 20. Accordingly, in some embodiments, the trim separating system 60 is located downstream from all of the scoring or cutting devices 48, or alternatively, from only a portion of the scoring or cutting devices 48. Once the one or more trim sections 22 are removed from the gum structure 20, the gum structure 20 may be provided to a downstream component or system of the gum manufacturing system, such as a device operable to separate the plurality of portions 24 for example.

An example of a trim separating system 60 is shown in more detail in FIGS. 4-7. As shown, the trim separating system 60 is located directly downstream from the at least one scoring or cutting device 48 and includes at least one mechanically driven device, also referred to herein as a force generating device 62 operable to exert a force on a corresponding trim section 22 of the gum structure 20. As shown, a movable surface of the force generating device may be operable to directly engage the trim section 22. In the illustrated, non-limiting embodiment, the force generating device 62 includes a roller driven about an axis of rotation X. However, embodiments where the force generating device 62 includes a conveyor, any other suitable device, or a combination of multiple devices, such as a conveyor and a roller, or are also within the scope of the disclosure.

The force generating device 62 may be positioned near an edge 28 or 32 of the gum structure 20, for example in vertical alignment with at least a portion of a trim section 22. As a result, a portion of the force generating device 62 is configured to contact the trim section 22. Although the force generating device 62 is shown being located vertically above the trim section 22, in other embodiments, the force generating device 62 may be disposed beneath the trim section 22 or adjacent a side of the trim section 22. In an embodiment, the force generating device 62 does not extend inwardly beyond the trim score line 36 and therefore does not overlap with or contact any portion of the remainder of the gum structure 20.

As shown, the force generating device 62 is mounted at an outwardly extending angle, illustrated at θ, relative to the direction of travel of the gum structure 20. In an embodiment, the angle θ is greater than 0° and less than about 90°. For example, the angle θ may be between about 5° and about 60°, between about 5° and about 45°, and between about 5° and 30°. In embodiments where the trim separating system 60 includes both a roller and a conveyor (see FIG. 6), the roller and the conveyor are generally parallel to one another. In the illustrated, non-limiting embodiment, the trim separating system 60 includes a first force generating device 62 arranged adjacent the first edge 28 of the gum structure 20 and a second force generating device 62 arranged adjacent the second opposite edge 32 of the gum structure 20, such that the trim sections 22 may be removed from the gum structure 20 substantially simultaneously. In such embodiments, the force generating devices 62 may be mounted at equal, but opposite angles relative to the direction of travel. However, embodiments where the force generating devices 62 are mounted at different angles are also within the scope of the disclosure.

By orienting the one or more force generating devices 62 at an outward angle relative to the direction of travel of the gum structure 20, at least a component of the force applied by the force generating device 62 to the trim section 22 is applied in a direction of breaking, which extends generally perpendicularly to the direction of travel of the gum structure.

As the gum structure 20 passes through the trim separating system 60, the one or more force generating devices 62 engage a corresponding trim section 22. As a result of this engagement, the force generating device 62 exerts a force on the trim section 22, directed generally away from the trim score 36. The force applied by the roller 62 to the trim section 22 in the direction of breaking causes the causes the trim section 22 to separate from the gum structure 20 along the trim score 36 via tension or application of a tensile force. In an embodiment, the drive device 62 is movable at a speed that is different than the speed of the gum structure 20 along the direction of travel. This difference in speed may further increase the force applied by the drive device 62 to the gum structure 20.

Figure 8:
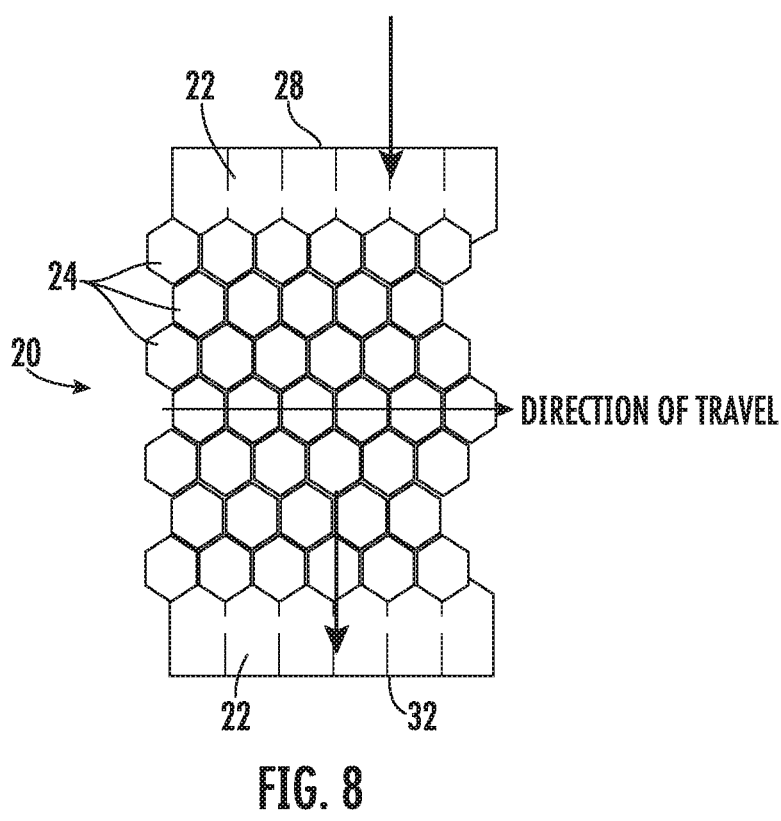
FIG. 8 is a schematic diagram of a trim separation system of a gum manufacturing system according to an embodiment.
Figure 9:
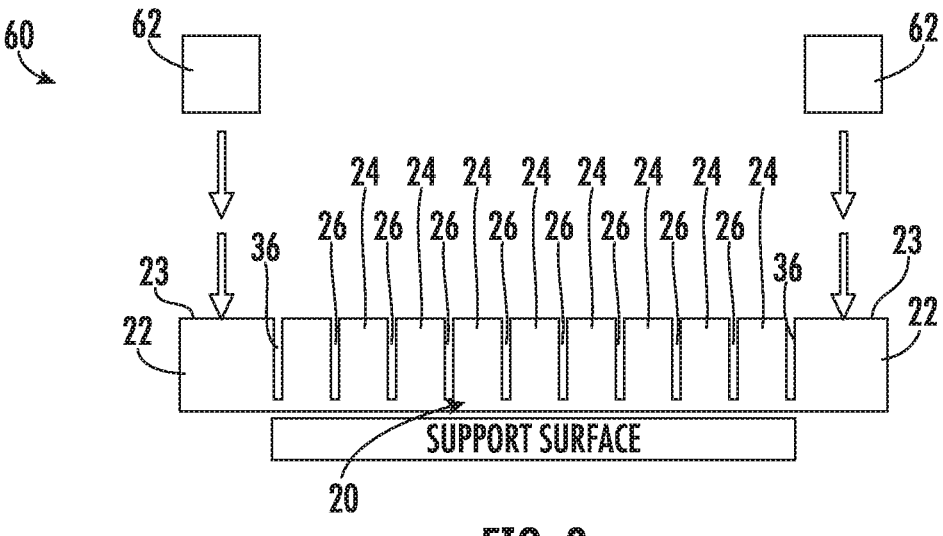
FIG. 9 is a cross-sectional of the trim section of FIG. 8 taken in a plane perpendicular to the direction of travel of the gum structure according to an embodiment.

With reference now to FIGS. 8 and 9, in another embodiment, the force generating device 62 of the trim separating system 60 includes one or more compressed air delivery units to facilitate the separation of the trim section 22 from one or more edges of the gum structure 20. The compressed air delivery units 62 may operate in conjunction with or independently of the one or more force generating devices 62 previously described herein to assist in separating the trim section 22 from the gum structure 20 along the trim score 36.

As the gum structure 20 is output from one or more scoring or cutting devices 48, compressed air from the at least one compressed air delivery unit 62 is applied to a surface of the trim section 22. As shown, the compressed air delivery units may be located proximate each of the trim sections 22. The compressed air expelled by the compressed air delivery units 62 is employed to sufficiently separate or at least partially separate the trim section 22 from the gum structure 20 along the trim score 36. As best shown in FIG. 9, the compressed air applied to the trim section 22 may flow in a generally vertical direction, such as vertically downward for example. In such embodiments, the compressed air is applied to an upper surface 23 of the trim section 22 and the resulting force generated by the application of the compressed air thereto causes the trim section 22 to separate from the gum structure 20 along the trim score 36 via shear. In other embodiments, the direction of the compressed air may be oriented such that a component of the force applied by the compressed air to the surface 23 of the trim section 22 is applied in a direction of breaking.

Figure 7:
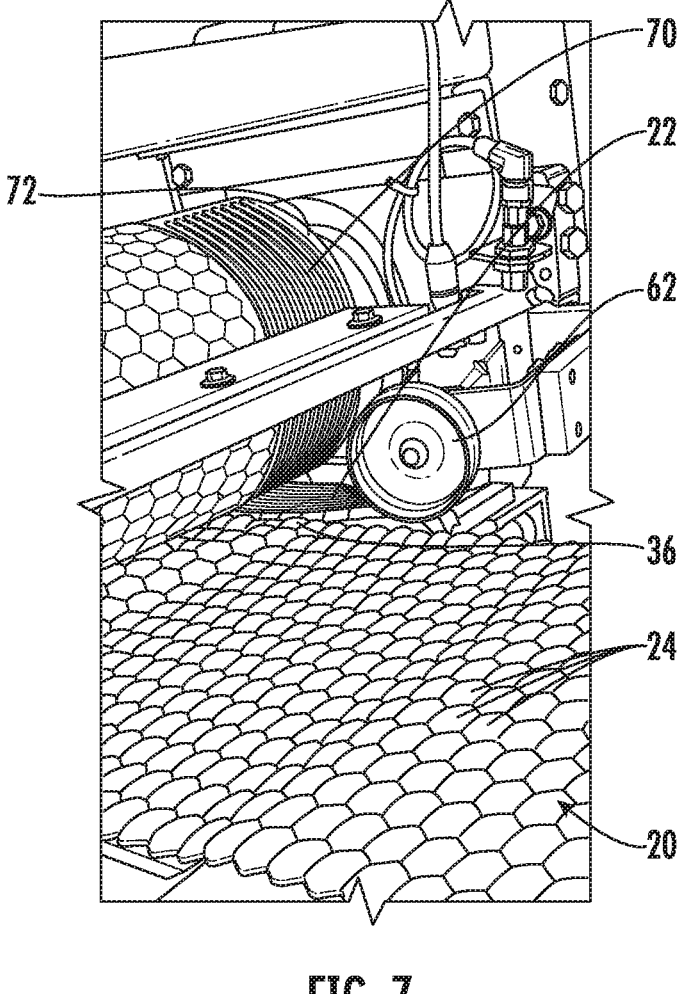
FIG. 7 is a detailed perspective view of a portion of the trim separation system of FIG. 6 according to an embodiment.

Regardless of the configuration of the trim separating system 60, in an embodiment, the at least one scoring or cutting device 48 located directly upstream from the trim separating system 60 includes a feature 70 operable to apply a force to a trim section in the direction of breaking. In an embodiment, the force applied by the feature to the trim section is used to move a trim section 22 into a desired positioned relative to an adjacent force generating device 62. The feature 70 is generally located at the cutting and scoring device 48 at a position that is aligned with a corresponding trim section 22. As best shown in FIG. 7, the feature 70 is positioned adjacent an end 72 of the scoring or cutting device 48 and is configured to contact the trim section 22 as the gum structure 20 traverses the scoring or cutting device 48. In the illustrated, non-limiting embodiment, the feature 70 includes a protrusion having a spiral-like configuration. However, other suitable features are also within the scope of the disclosure.

As the scoring or cutting device 48 rotates about its axis of rotation, a start point 74 of the feature 70 engages a portion of the trim section 22, such as near the trim score line 36 for example. With continued rotation of the scoring or cutting device 48, the trim section 22 maintains contact with the feature 70. Accordingly, as the scoring or cutting device 48 rotates about its axis of rotation, each progressive wrap of the feature 70 gradually moves the trim section 22 laterally outward, in a direction generally perpendicular to the direction of travel of the gum structure 20. The configuration of the feature 70 is selected based on consistency of the gum and the total distance for the trim section to be moved.

It should be appreciated that the trim separating system 60 illustrated and described herein may be part of a continuous and/or in-line gum manufacturing system, and may be arranged in-line with a scoring or cutting device 48. Inclusion of the trim separating system 60 allows for continuous and expedited gum production. By using a trim separating system 60 to actively apply a force to a trim section 22 to separate the trim section 22 from the remainder of a gum structure 20, the trim section 22 is more easily removed than in existing systems. Further, via application of a force thereto, the trim section 22 may be more cleanly severed from the gum structure 20, thereby limiting deformation of the gum structure 20, which is particularly beneficial during the formation of pieces or pellets 24 that have an irregularly shaped edge.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for separating a trim section from a continuous body of comestible structure, the method comprising:

moving said continuous body of said comestible structure along a direction of travel;

forming a trim score line in said continuous body of said comestible structure to define said trim section in said body of said comestible structure, said trim section being arranged between said trim score line and an outer periphery of said continuous body of said comestible structure;

after forming said trim score line to define said trim section, engaging said trim section of said continuous body of said comestible structure with at least a portion of at least one force generating device, said force generating device comprising a roller;

exerting, via said roller, a force on said trim section along a direction of breaking, said direction of breaking being arranged at an angle relative to said direction of travel of said continuous body of said comestible structure;

said force separating said trim section from the said continuous body of said comestible structure along said trim score line, wherein said forming said trim score line in said continuous body of said comestible structure is via at least one scoring or cutting device, said at least one scoring or cutting device comprising a spiral protrusion which engages a portion of said trim section and moves said trim section laterally out or laterally outwardly from the body of said comestible structure as it moves in said direction of travel.

2. The method of claim 1, wherein said force exerted to said trim section includes applying a tensile force to said trim section.

3. The method of claim 1, further comprising forming a comestible mass into the body of comestible structure via a forming system upstream from said forming said trim score line.

4. The method of claim 3, wherein said forming said comestible mass into the body of comestible structure and said forming said trim score line occur simultaneously.

5. A method for separating a trim section from a continuous body of comestible structure along a trim score line, the method comprising:

forming said trim score line in said continuous body of said comestible structure to define said trim section, said trim section being arranged between said trim score line and an outer periphery of said continuous body of said comestible structure;

after forming said trim score line to define said trim section, engaging said trim section with a force generating device, said force generating device including a roller;

wherein said roller exerts a force to a web of said trim score lines, said force being applied in a plane parallel to a surface of said continuous body of said comestible structure; and rupturing the web via said force to separate said trim section from said continuous body of said comestible structure, wherein said forming said trim score line in said continuous body of said comestible structure is via at least one scoring or cutting device, said at least one scoring or cutting device comprising a spiral protrusion which engages a portion of said trim section and moves said trim section laterally out or laterally outwardly from the body of said comestible structure as it moves in said direction of travel.

6. The method of claim 5, wherein said body of comestible structure is movable in a direction of travel and wherein said force applied to said web includes a first component and a second component and said first component extends in a direction transverse to said direction of travel of the body of comestible structure.

7. The method of claim 6, wherein said first component of said force is smaller than said second component of said force.

8. The method of claim 6, wherein said second component of said force extends perpendicularly to said direction of travel of the body of comestible structure.

9. The method of claim 5, further comprising forming a comestible mass into the body of comestible structure via a forming system upstream from said forming said trim score line.

10. The method of claim 1, wherein said direction of breaking and said direction of travel lie in a plane parallel to a surface of said continuous body of said comestible structure.

11. The method of claim 1, wherein said roller rotates about an axis of rotation at an angle relative to said direction of travel.

12. The method of claim 1, wherein said force generating device operates outwardly beyond said trim score line.

13. The method of claim 1, wherein said angle relative to said direction of travel is an angle extending outwardly relative to the body of said comestible structure as it moves in said direction of travel.

14. The method of claim 1, wherein said force generating device comprises a first force generating device and a second force generating device, said first force generating device arranged adjacent a first edge of said continuous body of said comestible structure, and said second force generating device arranged adjacent a second edge of said continuous body of said comestible structure, said first edge being opposite to said second edge of said continuous body of said comestible structure.

15. A method for separating a trim section from a continuous body of comestible structure, the method comprising:

moving said continuous body of said comestible structure along a direction of travel;

forming a trim score line in said continuous body of said comestible structure to define said trim section in said body of said comestible structure, said trim section being arranged between said trim score line and an outer periphery of said body of said comestible structure, said trim section extending along said direction of travel of said continuous body of said comestible structure;

applying compressed air to a surface of said trim section via at least one force generating device comprising a compressed air delivery unit;

wherein said compressed air exerts a force on said surface of said trim section along a direction of breaking;

wherein said force separates said trim section from said continuous body of said comestible structure along said trim score line, wherein said forming said trim score line in said continuous body of said comestible structure is via at least one scoring or cutting device, said at least one scoring or cutting device comprising a spiral protrusion which engages a portion of said trim section and moves said trim section laterally out or laterally outwardly from the body of said comestible structure as it moves in said direction of travel.

16. The method of claim 15, wherein said force is a shearing force applied by said compressed air delivery unit in a perpendicular direction to said surface of said trim section.

17. The method of claim 15, wherein said force is applied to said surface of said trim section along a direction of breaking, said direction of breaking being arranged at an angle relative to said direction of travel of said continuous body of said comestible structure.

18. The method of claim 15, wherein said force generating device comprises a first force generating device and a second force generating device, said first force generating device arranged adjacent a first edge of said continuous body of said comestible structure, and said second force generating device arranged adjacent a second edge of said continuous body of said comestible structure, said first edge being opposite to said second edge of said continuous body of said comestible structure.

* * * * *